United States Patent Office 3,423,482
Patented Jan. 21, 1969

3,423,482
SYNTHETIC FIBERS CONTAINING ORGANOTIN ITACONATE POLYMERS
Tatsuo Katsumura and Hirohisa Kataoka, Suita-shi, Osaka-fu, Yutaka Mizuno and Tsutomu Tsutsui, Osaka-shi, and Tadashi Nishihara, Sakai-shi, Japan, assignors to Nitto Kasei Co., Ltd., Osaka, Japan, a corporation of Japan
No Drawing. Filed Mar. 29, 1966, Ser. No. 538,231
U.S. Cl. 260—857                                22 Claims
Int. Cl. C08f 45/64; C08g 51/64, 53/00

ABSTRACT OF THE DISCLOSURE

A process for manufacturing synthetic fibers of polyamides, polyesters, polyolefins or acrylic polymers having durable resistance and biological activity against microorganisms which comprises adding to a fiber-forming composition about 0.005% to 5% by weight of an organotin polymer selected from the group consisting of a homopolymer of an unsaturated organotin compound having the general formula as shown below, an interpolymer of said unsaturated organotin compounds, a copolymer of said unsaturated organotin compound with other unsaturated polymerizable compound, and mixtures thereof, wherein said unsaturated organotin compound has the general formula

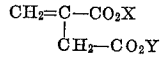

wherein one of X and Y is

wherein $R_1$, $R_2$ and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl of 1–12 carbon atoms; phenyl and benzyl; and spinning said fiber-forming composition into fiber having said organotin compound homogeneously dispersed therein.

---

This invention relates to a process for manufacturing synthetic fibers having durability and activity against microorganisms and to the fibers so produced.

Recently synthetic fibers such as polyamide, polyester, polyolefine, acrylic polymers, polyurethane, polyvinyl chloride, polyvinylidene chloride, etc. have found wide use, as they have a number of desirable properties, e.g. strength of fibers and water and chemical resistance. However, such fibers have problems which limit their usefulness. However, they are in general neither hygroscopic nor permeable to air. Hence, when they are employed in human apparel in direct contact with skin, human metabolities may cause a disagreeable odor and give rise to various inflammations of skin due to degeneration such as fermentation, putrefaction, etc. by the action of surrounding microorganisms. Synthetic fibers have also been used for ropes, fishing nets, etc., in which cases the growth of microorganisms thereon may cause loss of strength and service life.

Many chemicals have heretofore been proposed to provide the hygenic conditions and to improve durability but none of them satisfy all conditions, such as low toxicity to men and beasts, non-irritation, effectiveness and permanence. For example, lower alkyltin compounds such as acetates and chlorides of triethyltin, tripropyltin and tributyltin, oxides and sulfides of bis-tripropyltin and bis-tributyltin, and triethyltin hydroxide, etc., and aryltin compounds possess superior biological activity, but impart a disagreeable odor to the fiber and cause irritation which may lead to dermatitis.

It is an object of this invention to provide a process for imparting to synthetic fibers durable resistance to microorganisms without impairing the strength of said fibers. Other objects will be apparent to those skilled in the art on inspection of the following description.

In accordance with certain of its aspects, this invention relates to a process for manufacturing synthetic fibers having durable resistance and biological activity against microorganisms which comprises adding to a fiber-forming composition an organotin polymer selected from the group consisting of a homopolymer of an unsaturated organotin compound having the general formula as shown below, an interpolymer of said unsaturated organotin compounds, a copolymer of said unsaturated organotin compounds with other polymerizable unsaturated compound, and mixtures thereof, wherein said unsaturated organotin compound has the general formula

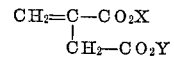

wherein one of X and Y is

wherein $R_1$, $R_2$, and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl containing 1–12 carbon atoms; phenyl; and benzyl; and spinning said fiber-forming polymer into fiber having said organotin polymer homogeneously dispersed therein.

In accordance with certain of its more specific aspects, this invention relates to a process for manufacturing synthetic fibers having durable resistance and biological activity against microorganisms which comprises adding to a low molecular weight fiber-forming polymerizable composition an organotin polymer selected from the group consisting of a homopolymer of an unsaturated organotin compound having the general formula as shown below, an interpolymer of said unsaturated organotin compounds, a copolymer of said unsaturated organotin compound with other polymerizable unsaturated compound, and mixtures thereof, wherein said unsaturated organotin compound has the general formula

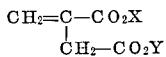

wherein one of X and Y is

wherein $R_1$, $R_2$, and $R_3$ are selected from the group consisting of lower alkyl and phenyl, which may be the same or different, and the other of X and Y is selected from the group consisthing of

wherein $R_1$, $R_2$, and $R_3$ are as defined above; —$HgR_4$ wherein $R_4$ is selected from the group consisting of lower alkyl and phenyl; hydrogen; alkyl containing 1–12 carbon atoms; phenyl; and benzyl; polymerizing said fiber-forming polymerizable composition thereby forming fiber-forming polymer and spinning said fiber-forming polymer into fiber having said organotin polymer homogeneously dispersed therein.

In accordance with other certain of its more specific aspects, this invention relates to a process for manufacturing synthetic fibers having durable resistance and biological activity against microorganisms which comprises adding to a fiber-forming polymer an organotin polymer selected from the group consisting of a homopolymer of an unsaturated organotin compound having the general formula as shown below, an interpolymer of said unsaturated organotin compounds, a copolymer of said unsaturated organotin compounds with other polymerizable unsaturated compound, and mixtures thereof, wherein said unsaturated organotin compound has the general formula

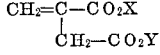

wherein one of X and Y is

wherein $R_1$, $R_2$ and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl containing 1–12 carbon atoms; phenyl; and benzyl; and spinning said fiber-forming polymer into fiber having said organotin polymer homogeneously dispersed therein.

The polymer of the unsaturated organotin compound of this invention can be applied in the process of manufacturing various synthetic fiber-forming compositions including low molecular weight polymerizable compositions and polymers prior to spinning. Typical fiber-forming compositions include polyamide, polyester, polyolefine, acrylic polymers, polyurethane, polyvinyl chloride, polyvinylidene chloride, etc. and the low molecular weight compositions from which the aforesaid are derived. The preferred fiber-forming compositions are polyamides and polyesters. The fiber-forming compositions may also include solvent, plasticizer, stabilizer, surface active agent, other fungicidal compound, pigment, or color inhibitor, if desired. In all cases, the polymers may be applied to the fiber-forming composition in the amount of 0.005% to 5% by weight of a unit of unsaturated triorganotin compound preferably 0.005% to 0.5% by weight, based on the weight of fiber-forming composition.

In the organotin polymers of the aforesaid general formula, when $R_1$, $R_2$, $R_3$, or $R_4$ is lower alkyl, alkyl groups containing 1–6 carbon atoms, i.e. methyl, ethyl, propyl, butyl, amyl and hexyl are included. When Y is alkyl containing 1–12 carbon atoms, the aforementioned alkyl groups are included as well as heptyl, octyl, nonyl, decyl, undecyl and dodecyl. When $R_1$, $R_2$, $R_3$, $R_4$ include hydrocarbon groups, inert or non-reactive substituents, e.g. alkyl, aryl, ether, halogen, etc., may be present on such groups.

The organotin polymers employed in this invention may preferably be homopolymers of a compound having the aforesaid general formula. Typical homopolymers include bis(tributyltin) itaconate polymer, bis(tripropyltin) itaconate polymer, tributyltin itaconate polymer.

The organotin polymers employed in this invention may also be interpolymers of compounds having the aforesaid general formula. A preferred interpolymer may be bis(tripropyltin) itaconate-bis(tributyltin) itaconate interpolymer.

The organotin polymers employed in this invention may also be copolymers of a compound having the aforesaid general formula with other polymerizable compound. The preferred polymerizable unsaturated compounds which may be copolymerized with a compound having the aforementioned formula include vinyl compounds such as butadiene, itaconic acid, vinyl chloride, vinyl acetate, vinylidene chloride, styrene, p-chlorostyrene, vinyl toluene, 2-vinyl furan, etc., acrylic compounds such as acrylic acid, methacrylic acid, alkyl ester thereof, organotin salt thereof, organomercury salt thereof, acrylonitrile, acrylamide, glycidyl methacrylate, etc., and mixtures thereof. Typical preferred copolymers include tripropyltin itaconatemethacrylic acid copolymer and tributyltin itaconate-acrylonitrile copolymer.

The polymers of tin compounds which are employed in the process of this invention can be easily obtained in the desired degree of polymerization and tin content by adding free radical polymerization initiators such as organic peroxide, azo compound, persulfate, etc. to the aforementioned unsaturated organotin compounds, the mixtures of unsaturated organotin compounds, or the mixtures of unsaturated organotin compounds with monomers of other copolymerizable unsaturated compounds and polymerizing by free radical catalysis in bulk, solution, suspension, or emulsion. The polymers thus obtained may be liquid, rubbery, or solid depending upon the triorganotin radicals derived from $R_1$, $R_2$, and $R_3$, the unsaturated carboxylic acid residues, the kind and ratio of monomer of other copolymerizable unsaturated compounds or the degree of polymerization. Consequently they can be applied to various synthetic fiber-forming compositions in the optimum processing conditions.

It is a particular feature of this process that the polymer of the unsaturated organotin compound imparts biocidal activity of a high order including high resistance to the deteriorating effect of washing. This may be attributed to the fact that the organotin polymer, which is a polymer of the organotin salt of a carboxylic acid, is uniformly dispersed throughout the synthetic fiber, after spinning, and may be gradually hydrolyzed to penetrate the tissue of microorganisms attached to the fibers. It is a further advantage that these polymers possess no disagreeable odors and do not cause irritation, so that, in contrast to monomeric organotin compounds, they do not give rise to discomfort or injury to the wearer of the fiber. Furthermore, the polymers are thermoplastic and soluble in organic solvents such as aromatic hydrocarbons, ketones, halogenated hydrocarbons, etc. and, because of good compatibility with fiber-forming polymers, a novel synthetic fiber composition may be formed.

The synthetic fiber composition comprises a synthetic fiber having homogeneously distributed therein the organotin polymer of the unsaturated organotin compound having the aforesaid general formula.

The organotin polymers also do not cause deterioration in the quality of the fiber, e.g. loss of strength, which typically may occur when monomeric organotin compounds or other fungicidal compounds are added to the fiber. A suitable choice of an organotin homopolymer, interpolymer, or copolymer, permits the dyeability and light resistance of the fiber to be improved.

Practice of this invention may be observed from the following illustrative examples in which each of the fibers formed with organotin polymer homogeneously dispersed therethrough was reeled up on a glass plate to produce a fiber sample and placed on a potato agar medium in a dish. The surface of the sample in the dish was uniformly sprayed with a suspension of mixed sporules of *Aspergillus niger, Penicillium citrinum, Cheatomium globosum, Myrothecium verrucaria*. The dishes were cultivated for two weeks at 28° C. and the degree of fungicide activity was observed and rated as follows.

+++—Surface of sample covered with sporules.
++—Sporules partially covering surface of sample.
+—Outbreak of mycelium on surface of sample.
—Area of growth control around sample.

Washing was performed according to A.S.T.M. and strength was determined on a Schopper's Tension Tester. Strength loss is reported in percent of strength lost after exposure for the noted time in a Fade-O-Meter.

Example 1

Aliquots of 0.36 gram, 0.18 gram and 0.036 gram of bis(tributyltin) itaconate polymer (average molecular weight of about 9,800) were added to separate quantities of 300 grams of 60% aqueous solution of 6, 6 nylon salt (adipic acid hexamethylene di-ammonium) and each resultant mixture was heated at 270° C. and 17 atm. for 30 hours. The fiber-forming polymers obtained from said reaction were washed and completely dehydrated at 100° C. for 5 hours under reduced pressure after drying in air. They were put into a spinning tube and were forced out from small holes having a diameter of 0.1 mm. by pressure pump after heating and melting at 260° C. in the nitrogen atmosphere. This fine yarn was reeled up through water and then stretched 400% at room temperature. For purposes of comparison, two additional fibers were formed by this technique, one of which contained no organotin compound and one of which contained 0.36 gram of tri-n-butyltin acetate in place of the organotin polymer. Table I shows the results of the experiments made on these five samples, indicating the superiority of the organotin polymer containing composition.

TABLE I.—STRENGTH LOSS ON EXPOSURE

| Additives | Amount (percent) | Tint of fiber | Nonexposed (g./d.) | Exposed for— | | Biological activity | | |
|---|---|---|---|---|---|---|---|---|
| | | | | 50 hrs. (percent) | 100 hrs. (percent) | No washing | 30 washings | 50 washings |
| Polymer of bis(tributyltin) itaconate. | 0.2 | None.. | 5.0 | 12 | 20 | — | — | — |
| | 0.1 | ...do... | 4.5 | 12 | 23 | — | — | — |
| | 0.02 | ...do... | 4.5 | 15 | 25 | — | — | + |
| Tri-n-butyltin acetate | 0.2 | None.. | 4.5 | 25 | 40 | — | + | ++ |
| None | | None.. | 4.5 | 35 | 55 | +++ | +++ | +++ |

Example 2

An emulsion formed from 0.2 gram of bis(tri-n-propyltin) itaconate-bis(tri-n-butyltin) itaconate copolymer, 0.8 gram of toluene, and 0.3 gram of alkyl phenol-polyethylene glycol ether was added to 100 grams of ε-caprolactam after diluting with 10 grams of water and reaction was continued at 260° C. and 17 atm. for 30 hours. Fiber-forming polymer obtained from this reaction was washed and completely dehydrated at 100° C. for 5 hours under reduced pressure after drying and then said fiber-forming polymer was put into a spinning tube and flowed out from small holes having a diameter of 0.1 mm. by pressure pump after heating and melting at 260° C. in a nitrogen atmosphere. This fine yarn was reeled up through water and then stretched by 400% at the room temperature. For purposes of comparison, two fibers were made by the identical procedure, one of which contained no organotin compound and one of which contained 0.1 gram of tri-phenyltin acetate in place of the organotin copolymer. Results of the comparison are shown in Table II, indicating the superiority of the organotin polymer containing composition.

TABLE II.—STRENGTH LOSS ON EXPOSURE

| Additives | Tint of fiber | Nonexposed (g./d.) | Exposed for— | | Biological activity | | |
|---|---|---|---|---|---|---|---|
| | | | 50 hrs. (percent) | 100 hrs. (percent) | No washing | 30 washings | 50 washings |
| Interpolymer of bis(tri-n-propyltin)itaconate and bis(tri-n-butyltin) itaconate. | None.. | 4.2 | 12 | 20 | — | — | — |
| Tri-phenyltin acetate | do... | 4.2 | 30 | 50 | — | ++ | +++ |
| None | do... | 4.3 | 40 | 60 | +++ | +++ | +++ |

Example 3

Separate quantities of 0.8 gram and 0.05 gram of bis(tri-n-propyltin) itaconate-methacrylic acid copolymer were dissolved in separate quantities of 130 grams of ethylene glycol. Each solution was mixed with 200 grams of dimethyl terephthalate and 0.1 gram of lead oxide and then methanol was distilled off while polymerization took place at 180° to 190° C. for 2 hours in a reaction vessel filled with nitrogen gas. The initial condensate was heated at 290° C. for 7.5 hours at pressure of 0.3 mm./Hg after first drying by heating at 280° C. for 30 minutes at atmospheric pressure. The fiber-forming polymer obtained was dried at 200° C. at reduced pressure after drying in air and then was put into a spinning tube and was heated at 300° C. The fused mass flowed out as fine yarn on raising the internal pressure on opening small holes in the bottom having a diameter of 0.1 mm. This fine yarn was reeled up through water and then stretched by 500% at 80° C. For purposes of comparison, two fibers were made by the identical procedure, one of which contained no organotin compound and one of which contained 0.8 gram of tri-n-propyltin acetate in place of the organotin copolymer. Results of the comparison are shown in Table III, indicated superiority of the organotin polymer containing composition.

the comparison of these two samples, and indicates the superiority of the organotin containing composition.

TABLE III.—STRENGTH LOSS ON EXPOSURE

| Additives | Amount (percent) | Tint of fiber | Nonexposed (g./d.) | Exposed for— | | Biological activity | | |
|---|---|---|---|---|---|---|---|---|
| | | | | 50 hrs. (percent) | 100 hrs. (percent) | No washing | 30 washings | 50 washings |
| Copolymer of bis(tri-n-propyltin) itaconato and methacrylic acid. | 0.3 | None | 4.4 | 4 | 8 | — | — | — |
| | 0.02 | ...do... | 4.4 | 6 | 11 | — | — | + |
| Tri-n-propyltin acetate | 0.3 | None | 4.3 | 10 | 15 | — | + | ++ |
| None | | None | 4.5 | 10 | 20 | +++ | +++ | +++ |

Example 4

A mixture containing 190 grams of acrylonitrile, 10 grams of methyl methacrylate and 0.2 gram of bis(tri-n-propyltin) itaconate-methacrylic acid copolymer was added to 2.4 kilograms of water and was heated at 50° C. Polymerization reaction was continued for 7 hours by adding 6 grams of ammonium persulfate and 0.6 gram of β-mercaptoethanol. 25 grams of the fiber-forming polymer so obtained was added to 100 grams of dimethyl formamide; the mixture was thoroughly stirred and dispersed to lacteal condition and then viscous solution was obtained by heating at 60° C. This concentrated solution as spinning solution was pushed out into glycerine bath at 100° C. and stretch by 500% was performed during coagulation. For purposes of comparison, two fibers were prepared by the identical technique, one of which contained no organotin compound and one of which contained 0.2 gram of tri-n-butyltin acetate in place of the organotin copolymer. Table IV shows the results of the comparison of these three samples, and indicates the superiority of the organotin polymer containing composition.

TABLE IV

| Additives | Tint of fiber | Biological activity | | |
|---|---|---|---|---|
| | | No washing | 30 washings | 50 washings |
| Copolymer of bis(tri-n-propyltin) itaconate and methacrylic acid | None | — | — | — |
| Tri-n-butyltin acetate | ...do... | — | + | ++ |
| None | ...do... | +++ | +++ | +++ |

Example 5

100 grams of propylene and 0.1 gram of bis(tri-n-propyltin) itaconate polymer were heated at 80° C. in the presence of solution of tri-ethyl aluminum (5.7 grams) titanium trichloride (2.0 grams) complex in 80 ml. of n-heptane. After 4 hours the reaction was stopped by adding methanol. The product obtained was coagulated in methanol to which hydrochloric acid was added, filtered, and washed with methanol. The fiber-forming polymer so prepared was pushed out into the air from small holes having a diameter of 0.5 mm. at 230° C. and spun into fibers after drawing to 5.5 times its length at 120° C. An additional sample which contained no organotin compound was made as a control. Table V shows the results of

TABLE V

| Additives | Tint of fiber | Biological activity | | |
|---|---|---|---|---|
| | | No washing | 10 washings | 30 washings |
| Polymer of bis(tri-n-propyltin) itaconate. | None | — | — | — |
| None | Light yellow | +++ | +++ | +++ |

Example 6

To separate quantities of 300 grams of chips of fiber-forming polyethylene terephthalate heated to dryness under reduced pressure, separate quantities of 0.6 gram, 0.3 gram, and 0.06 gram, respectively, of copolymer of tri-n-propyltin itaconate with methacrylic acid in the molar ratio of 1:0.57 were added and the mixtures were heated at 300° C. in a spinning tube under a nitrogen atmosphere. When the mixtures were completely melted they were forced through a fine nozzle having a diameter of 0.1 mm. by a pressure pump. The fine yarn thus produced was reeled up through water and then stretched 500% at 80° C. For purposes of comparison, two fibers were produced by the identical procedure, one of which contained no organotin compound and one of which contained 0.6 gram of tri-n-propyltin acetate in place of the organotin copolymer. Table VI shows the results of the experiments made on these five samples as to loss of strength on exposure to ultraviolet rays and the lowering of biological activity by washing, and indicates the superiority of the organotin polymer containing composition.

TABLE VI.—STRENGTH LOSS ON EXPOSURE

| Additives | Amount (percent) | Tint of fiber | Nonexposed (g./d.) | Exposed for— | | Biological activity | | |
|---|---|---|---|---|---|---|---|---|
| | | | | 50 hrs. (percent) | 100 hrs. (percent) | No washing | 10 washings | 30 washings |
| Copolymer of tri-n-propyltin itaconate and methacrylic acid. | 0.2 | None | 4.5 | 2 | 5 | — | — | — |
| | 0.1 | ...do... | 4.5 | 2 | 5 | — | — | — |
| | 0.02 | ...do... | 4.5 | 2 | 7 | — | + | ++ |
| Tri-n-butyltin acetate | 0.2 | None | 4.5 | 7 | 15 | — | + | +++ |
| None | | None | 4.5 | 10 | 20 | -++ | +++ | +++ |

Example 7

To separate quantities of 300 grams of chips of dried fiber-forming nylon 6, separate quantities of 0.6 gram, 0.3 gram, and 0.06 gram, respectively, of tri-n-butyltin itaconate polymer (average molecular weight of about 9,800) were added and the mixtures were heated at 260° C. in a spinning tube under a nitrogen atmosphere. When the mixtures were completely melted they were forced into water through a fine nozzle having a diameter of 0.1 mm. by a pressure pump and reeled up. The fine yarn obtained was stretched 400% to prepare samples. For purposes of comparison, two fibers were made by the identical procedure, one of which contained no organotin compound and one of which contained 0.6 gram of tri-n-butyltin acetate in place of the organotin polymer. Table VII shows the results of the experiments made on these five samples in the same way as in the Example 6, indicating the superiority of the organotin polymer containing composition.

TABLE VII.—STRENGTH LOSS ON EXPOSURE

| Additives | Amount (percent) | Tint of fiber | Nonexposed (g./d.) | Exposed for— | | Biological activity | | |
|---|---|---|---|---|---|---|---|---|
| | | | | 50 hrs. (percent) | 100 hrs. (percent) | No washing | 10 washings | 30 washings |
| Polymer of tri-n-butyltin itaconate. | 0.2 | None | 4.2 | 12 | 20 | — | — | — |
| | 0.1 | ...do... | 4.3 | 14 | 20 | — | — | — |
| | 0.02 | ...do... | 4.3 | 20 | 30 | — | + | ++ |
| Tri-n-butyltin acetate | 0.2 | None | 4.2 | 30 | 50 | — | + | +++ |
| None | | None | 4.3 | 40 | 60 | +++ | +++ | +++ |

Example 8

To 300 grams of crystalline fiber-forming polypropylene having an average molecular weight of about 110,000, 0.3 gram of bis(tri-n-propyltin) itaconate polymer having an average molecular weight of about 20,000 was added. When the mixture was completely melted, it was forced into the surrounding air through a fine nozzle having a diameter of 0.5 mm. at 230° C. The fine yarn produced was stretched 550% at 120° C. and then reeled up. For purposes of comparison, the sample which contained no organotin compound was prepared. Table VIII shows the results of the experiments made on these samples, indicating the superiority of the organotin polymer containing composition.

TABLE VIII

| Additives | Tint of fiber | Biological activity | | |
|---|---|---|---|---|
| | | No Washing | 10 Washings | 30 Washings |
| Polymer of bis(tri-n-propyltin) itaconate. | None | — | — | — |
| None | Colored slightly | +++ | +++ | +++ |

Example 9

100 grams of a fiber-forming copolymer of acrylonitrile with methyl acrylate (wherein the molar ratio of acrylonitrile to methyl acrylate was 95:5) and 0.5 gram of bis (tri-n-butyltin itaconate) with acrylonitrile (wherein the molar ratio of bis(tri-n-butyltin)itaconate to acrylonitrile was 1:0.4) copoylmer were dissolved in 600 grams of dimethyl formamide. This spinning solution was extruded into a coagulation bath of 50% aqueous solution of dimethyl formamide at 20° C. The spun yarns were stretched 700% under a steam atmosphere, washed with hot water and then reeled up after drying at 80° C. For purposes of comparison a sample which contained no organotin compound was prepared. Table IX shows the results of the experiments made on these samples, indicating the superiority of the organotin polymer containing composition.

TABLE IX

| Additives | Tint of fiber on exposure to ultraviolet rays | | Biological activity | | |
|---|---|---|---|---|---|
| | Non-exposed | Exposed for 40 hrs. | No washing | 10 washings | 30 washings |
| Copolymer of bis(tri-n-butyltin) itaconate and acrylonitrile. | None | Colored slightly | — | — | — |
| None | Colored slightly | Brown | +++ | +++ | +++ |

While there has been described specific examples in connection with the preferred embodiment of this invention, it will be obvious to those skilled-in-the-art that various changes and modifications may be made therein without departing from the invention.

We claim:

1. A process for manufacturing synthetic fibers of polyamides, polyesters, polyolefins or acrylic polymers having durable resistance and biological activity against microorganisms which comprises adding to a fiber-forming composition about 0.005% to 5% by weight of an organotin polymer selected from the group consisting of a homopolymer of an unsaturated organotin compound having the general formula as shown below, an interpolymer of said unsaturated organotin compounds, a copolymer of said unsaturated organotin compound with other unsaturated polymerizable compound, and mixtures thereof, wherein said unsaturated organotin compound has the general formula $$CH_2=C-CO_2X$$
$$\phantom{CH_2=C-}CH_2-CO_2Y$$

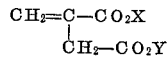

wherein one of X and Y is wherein $R_1$, $R_3$, and $R_4$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl of 1–12 carbon atoms; phenyl; and benzyl; and spinning said fiber-forming composition into fiber having said organotin compound homogenously dispersed therein.

2. The process for manufacturing synthetic fibers having durable resistance and biological activity against microorganisms as claimed in claim 1 wherein said organotin polymer is said homopolymer of said unsaturated organotin compound.

3. The process for manufacturing synthetic fibers having durable resistance and biological activity against microorganisms as claimed in claim 1 wherein said organotin polymer is said interpolymer of said unsaturated organotin compounds.

4. The process for manufacturing synthetic fibers having durable resistance and biological activity against microorganisms as claimed in claim 1 wherein said organotin polymer is said copolymer of said unsaturated organotin compound and said other unsaturated compound.

5. The process for manufacturing synthetic fibers having durable resistance and biological activity against microorganisms as claimed in claim 1 wherein said organotin polymer is a homopolymer of bis(tri-n-butyltin) itaconate.

6. The process for manufacturing synthetic fibers having durable resistance and biological activity against microorganisms as claimed in claim 1 wherein said organotin polymer is a homopolymer of bis (tri-n-proplytin) itaconate.

7. The process for manufacturing synthetic fibers having durable resistance and biological activity against microorganisms as claimed in claim 1 wherein said organotin polymer is a homopolymer of tri-n-butyl-tin itaconate.

8. The process for manufacturing synthetic fibers having durable resistance and biological activity against microorganisms as claimed in claim 1 wherein said organotin polymer is a copolymer of tri-n-propyltin itaconate and methacrylic acid.

9. The process for manufacturing synthetic fibers having durable resistance and biological activity against microorganisms as claimed in claim 1 wherein said organotin polymer is an interpolymer of bis(tri-n-propyltin) itaconate and bis(tri-n-propyltin) itaconate.

10. The process for manufacturing synthetic fibers having durable resistance and biological activity against microorganisms as claimed in claim 1 wherein said unsaturated organotin compound is present in amount of 0.005%–5% by weight of said fiber-forming composition.

11. A process for manufacturing synthetic fibers of polyamides, polyesters, polyolefins or acrylic polymers having durable resistance and biological activity against microorganisms which comprises adding to a low molecular weight fiber-forming polymerizable composition about 0.005% to 5% by weight of an organotin polymer selected from the group consisting of a homopolymer of an unsaturated organotin compound having the general formula as shown below, an interpolymer of said unsaturated oragnotin compounds, a copolymer of said unsaturated organotin compound with other polymerizable unsaturated compound, and mixtures thereof, wherein said unsaturated organotin compound has the

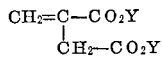

wherein one of X and Y is
wherein $R_1$, $R_2$, and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl of 1—12 carbon atoms; phenyl; and benzyl; polymerizing said fiber-forming polymerizable composition thereby forming fiber-forming polymer and spinning said fiber-forming polymer into fiber having said organotin polymer homogeneously dispersed therein.

12. A process for manufacturing synthetic fibers of polyamides, polyesters, polyolefins or acrylic polymers having durable resistance and biological activity against micoorganisms which comprises adding to a fiber-forming polymer about 0.005% to 5% by weight of an organotin polymer selected from the group consisting of a homopolymer of unsaturated organotin polymer of an organotin compound having the general formula as shown below; an interpolymer of said unsaturated organotin compounds, a copolymer of said organotin compound with other polymerizable unsaturated compound, and mixtures thereof, wherein said unsaturated organotin compound has the general formula

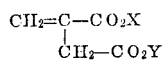

wherein one of X and Y is

where $R_1$, $R_2$, and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl of 1–12 carbon atoms; phenyl; and benzyl; and spinning said fiber-forming polymer into fiber having said organotin polymer homogeneously dispersed therein.

13. A novel synthetic fiber of polyamides, polyesters, polyolefins or acrylic polymers having durable resistance and biological activity against microorganisms which comprises a synthetic fiber having homogeneously dispersed therein, in polymeric form, about 0.005%–5% by weight of an organotin polymer selected from the group consisting of a homopolymer of unsaturated organotin polymer of an organotin compound having the general formula as shown below, an interpolymer of said unsaturated organotin compounds, a copolymer of said organotin compound with other polymerizable unsaturated compound, and mixtures thereof, wherein said unsaturated organotin compound has the general formula

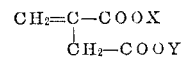

wherein one of X and Y is

wherein $R_1$, $R_2$, and $R_3$ are selected from the group consisting of lower alkyl and phenyl, which may be the same or different, and the other of X and Y is selected from the group consisting of

wherein $R_1$, $R_2$, and $R_3$ are as defined above; —$HgR_4$ wherein $R_4$ is selected from the group consisting of lower alkyl and phenyl; hydrogen; alkyl of 1–12 carbon atoms; phenyl; and benzyl.

14. A novel synthetic fiber having durable resistance and biological activity against microorganisms as claimed in claim 13 wherein said organotin polymer is said homopolymer of said unsaturated organotin compound.

15. A novel synthetic fiber having durable resistance and biological activity against microorganisms as claimed in claim 13 wherein said organotin polymer is said interpolymer of said unsaturated organotin compounds.

16. A novel synthetic fiber having durable resistance and biological activity against microorganisms as claimed in claim 13 wherein said organotin polymer is said copolymer of said unsaturated organotin compound and said other unsaturated compound.

17. A novel synthetic fiber having durable resistance and biological activity against microorganisms as claimed in claim 13 wherein said organotin polymer is a homopolymer of bis(tri-n-butyltin) itaconate.

18. A novel synthetic fiber having durable resistance and biological activity against microorganisms as claimed in claim 13 wherein said organotin polymer is a homopolymer of bis(tri-n-propyltin) itaconate.

19. A novel synthetic fiber having durable resistance and biological activity against microorganisms as claimed in claim 13 wherein said organotin polymer is a homopolymer of tri-n-butyltin itaconate.

20. A novel synthetic fiber having durable resistance and biological activity against microorganisms as claimed in claim 13 wherein said organotin polymer is copolymer of tri-n-propyltin itaconate and methacrylic acid.

21. A novel synthetic fiber having durable resistance and biological activity against microorganisms as claimed in claim 13 wherein said organotin polymer is an interpolymer of bis(tri-n-propyltin) itaconate and bis(tri-n-propyltin) itaconate.

22. A novel synthetic fiber having durable resistance and biological activity against microorganisms as claimed in claim 13 wherein said synthetic fiber is selected from the group consisting of polyamides and polyesters.

No references cited.

MURRAY TILLMAN, *Primary Examiner.*

P. LIEBERMAN, *Assistant Examiner.*

U.S. Cl. X.R.

260—45.15, 45.75, 89.3, 859, 873, 887, 897, 898, 899, 901, 999